March 9, 1965     C. F. ROSENBLAD     3,172,802
RECOVERY OF SO₂ GAS RESULTING FROM THE BLOWING
OF A DIGESTER IN SULPHITE PULP DIGESTION
Filed July 10, 1962
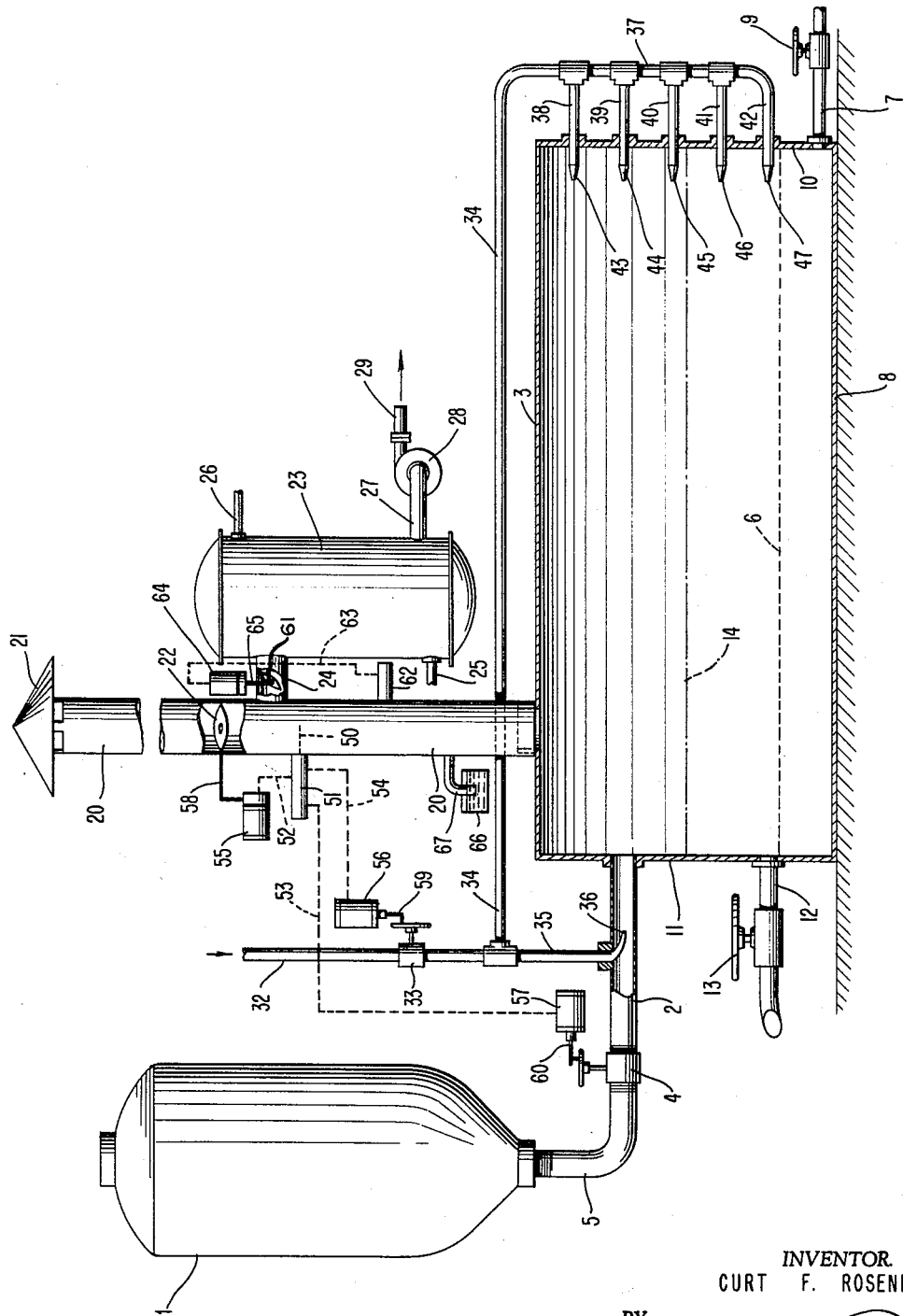
INVENTOR.
CURT F. ROSENBLAD
BY
*Albert M. Parker*
ATTORNEY

United States Patent Office 3,172,802
Patented Mar. 9, 1965

3,172,802
RECOVERY OF SO₂ GAS RESULTING FROM THE BLOWING OF A DIGESTER IN SULPHITE PULP DIGESTION
Curt F. Rosenblad, Princeton, N.J.
(1270 6th Ave., New York 20, N.Y.)
Filed July 10, 1962, Ser. No. 208,855
6 Claims. (Cl. 162—52)

This invention relates to improvements in recovery of SO₂ gas from sulphite pulp digestion and is particularly concerned with a method and apparatus for improving on the recovery of SO₂ gas given off in the blowing of sulphite pulp digesters.

In the cooking process heretofore practiced in the sulphite pulp industry, an unnecessarily high consumption, or loss of sulphur results through certain losses of SO₂ gas, also, in many instances, creating an air pollution problem. The greatest of these losses and that with which the instant invention is concerned, is that which takes place when the digesters are blown. Furthermore, the blow gases have the highest SO₂ content and thus the loss is the greatest close to the time when the blow is commenced.

In a short time, such as a period of one to two minutes from the commencement of the blow, depending on the size of the digester, a considerable quantity of SO₂ gas and water vapor are liberated from the digester and are mixed with the air already present in the blowpit into which the stock has been discharged. Though various systems have been developed for recovering this water vapor or steam and the SO₂ gas in the blowpit, none of them have been particularly successful in recovering the full amount of the SO₂ liberated. This is due to the fact that the SO₂ content of the blow gases becomes mixed with the air in the blowpit as well as in the piping and in the condenser. This mixing makes it difficult to absorb the SO₂ in a simple and economical manner.

With air in the blowpit and piping mixed with the existing mixture of gases including SO₂, the SO₂ content of the mixture can go down to as low as 20%. Considering that at least a 50% strength of SO₂ in any such mixture of gases is required for obtaining good absorption in an absorption tower, considerable loss of SO₂ would result even if all of this low SO₂ percentage mixture according to the prior art were passed through an absorption tower. However, that cannot be done, for, in accordance with the prior art practices, to avoid back pressure in the system the first part of the blow gases has to be discharged to atmosphere through the vomit stack, with the stack valve fully open. This first part is just the part of the blow when the mixture of gases has the greatest concentration of SO₂ in it. Thus the best would be lost as well as polluting the air in that area.

The method and apparatus of the invention enables the recovery of this SO₂ gas from the blowing of the digester contents in a simple, straightforward manner. This is accomplished by removing the air from the piping and blowpit immediately before the blow commences and commencing the blow at just the point when that air has been removed. This is done by introducing steam in special manner into the blowpit and piping so that the steam displaces the air therein. Such steam mixes with the mixture SO₂ and non condensable gases. Unlike air, however, the steam can be readily separated from the mixture of gases including the SO₂ leaving the SO₂ at its full strength, to go into an absorption tower, rather than being lost in the atmosphere, as well as creating air pollution. Though some steam is consumed, or is lost up the vomit stack, in the course of clearing the air out of the system, a generally corresponding amount of steam from the digester is recovered or at least has its heat value recovered in the condenser. In any event, the additional recovery of SO₂ is the significant and important thing.

It is, accordingly, the principal object of the invention to improve upon the recovery of SO₂ gas from sulphite pulp cooking.

Another object is to effect such recovery from the mixture of gases including SO₂ liberated in the blowing of a digester.

Still another object is to eliminate air pollution otherwise occurring from the liberation of SO₂ containing gases into the atmosphere resulting from the blowing of a sulphite pulp digester.

A further object is to maintain the highest percentage of SO₂ gas during the whole blowing period and prevent air leakage into the system during the latter part of the blow, when usually a certain vacuum will build up.

A further object is to provide simple and effective apparatus which can be readily combined with existing installations to enable them to be operated in accordance with the method of the invention.

Still further and more detailed objects of the invention will in part be obvious and in part be pointed out as the description of the invention taken in conjunction with the accompanying drawing proceeds.

The single figure of that drawing shows diagrammatically the application of the invention to an arrangement as used in the sulphite pulp industry involving a digester for the cooking of the pulp and a blowpit into which the contents of the digester are blown on the completion of the cook. Common adjuncts to this apparatus not essential to the understanding of the invention have been omitted in the interests of focusing on the invention itself. Accordingly, the digester indicated at 1 is to be considered as of the usual type found in the sulphite pulp industry. Actually, in accordance with the invention, a bank of digesters would be most likely to be present with each digester connected to an individual blowpit. In this case the individual vomit stacks for the blowpits are replaced by pipes connected to a common header connected to a mutual condensing absorption system. There is, however, no need for any such combined equipment to be shown for an understanding of the invention, any more than there is need for a showing of conventional equipment for the charging of the digester.

The representative digester 1 has the interior thereof connected by means of the blowpipe 2 into the interior of the blowpit 3. Flow through the blowpipe 2 is controlled by the blow valve 4 located towards the end 5 where that pipe connects with the lower end of the digester 1 for the blowing of the contents of the same.

The blowpit 3 is provided with the customary screen 6 adjacent its bottom so that the spent liquor from the cooked pulp can be drained off below the screen through the outlet line 7 aligned with the bottom 8 of the blowpit under the control of the valve 9. The line extends out through the end wall 10 of the blowpit while opposite end wall 11 has the pulp discharge 12 extending therethrough in communication with the interior of the blowpit just above the screen 6 equipped with dumping valve 13. The line 14 is generally indicative of the top level of the pulp and liquor mix in the blowpit before liquor runoff and the drawing off of the pulp had proceeded to any particularly extent.

The customary vomit stack 20 communicates with the blowpit 3 and extends upwardly therefrom adjacent the end 11. This stack is equipped with the top 21 mounted thereon in conventional manner so that gases from the stack can pass out beneath it. The stack 20 is also provided with the stack valve 22 positioned part way up the stack and arranged to completely cut off or vary passageway for gas up the stack as desired. In this instance, also, a surface condenser 23 is shown as having a pipe inlet from the stack at 24 just below the valve 22. The inlet pipe 24 has a diameter which is a major proportion of the diameter of the stack 20 for reasons that will appear hereinafter.

The condenser 23 has a cooling water inlet at 25 and an outlet at 26 which may lead to some apparatus where the heat content gained by this cooling water in its passage through the condenser can be readily employed. The condenser 23 also has an outlet pipe 27 through which the mixture of $SO_2$ and non condensable gases, separated from the steam by condensation in the condenser, can be taken off by means of the fan 28 and be dispatched through the line 27 to a suitable absorption system for absorbing or collecting the $SO_2$ content of this gas mixture. Obviously, a suitable line can be employed for taking off the condensate from the condenser.

The additional apparatus in accordance with the invention and which enables the carrying out of the method of the same will now be described. First there is an additional steam line 32 through which live steam is added to the system for the period desired, which addition is under the control of the valve 33 in the line 32. Just beyond this valve 33 the line 32 has a branch 34 communicating therewith and extending off to the right as seen in the accompanying drawing. The line 32 continues on past that branch in the portion 35 which extends into the interior of the blowpipe 2 between the wall 11 of the blowpit and the blow valve 4. The portion 35 terminates in a steam jet 36 within the blowpipe 2 directed so as to emit steam along the pipe 2 in the direction of the blowpit 3 to aspirate the air in the pipe into the blowpit and help in displacing air into the blowpit with steam.

The branch pipe 34 extends to the opposite end 10 of the blowpit and then turns downwardly into a supply portion 37 from which a plurality of short conduits, 38, 39, 40, 41 and 42 extend through the end wall 10 to terminate respectively in jets 43 through 47 directed horizontally and towards the opposite end 11. Though five jets have been shown for the purposes of illustration, it is of course to be understood that the number employed will be that necessary to produce the desired effect in the particular blowpit. Furthermore, the column of jets may well be duplicated by other columns of like, or different number, separately positioned along the whole of the end of the blowpit. Fundamentally, the purpose of these jets, assisted by the jet 36 is to flood the interior of the blowpit 3 as well as the vomit stack 20 with steam so as to drive all of the air therein out of the vomit stack through its open upper end. Of course, to enable this to be done the valve 22 in the vomit stack needs to be in fully open position.

A thermal responsive element 50 extends into the vomit stack 20 just below the position of the stack valve 22. This element transmits its response to a control or contact member 51 capable of closing electric circuits through the lines 52, 53 and 54 to the respective electro-mechanical valve operating devices 55, 56 and 57. These devices are reversible electric motors, solenoids or other common devices capable of opening and closing valves. Furthermore the valves may be spring loaded or otherwise biased for movement in one direction with the motors acting merely to move them in the opposite direction. The device 55 controls the position of the valve 22 through suitable linkage 58, while the device 56 is linked to the valve 33 by means of the linkage 59 for actuation of the valve 33. Finally, the device 57 is linked through the linkage 60 for actuation of the blow valve 4. It will, accordingly, be seen that the positions of the valves 22, 33 and 4 are made responsive to the impulse imparted to the control member 51 by the thermal element 50.

To avoid vacuum developing in the system caused by too high condensing effect in the condenser 23, or overcapacity of the fan 28, an automatically controlled valve 61 is installed ahead of the condenser 23 in pipeline 24, activated by a vacuum pressure responsive element 62 in communication with the interior of the pipe 20. The element 62 is electrically connected by a line 63 with a motor or similar device 64 connected to actuate the valve 61 through the link 65. The valve 61 should be fully open at atmospheric pressure and higher pressure. When the blow starts by the opening of valve 4 following the closing of valve 22, usually a certain back pressure builds up. This is because during the first part of the blow the vapors are comparatively rich on non-condensable gases. During the latter part of the blow, however, most $SO_2$ and non condensable gases have passed. The condenser, supplied wtih cooled water can then build up a vacuum in the whole system. Considering that blowpits and blow lines are not designed to resist any considerable vacuum, a vacuum breaker of simple design is installed in the vent stack 20 or the mutual header for a number of blowpits. This consists of a conduit 67, communicating with the interior of the pipe 20 and terminating at its outer end in a water seal 66. The control valve 61 functions to avoid air intake through the water seal 66 or other sources of leakage in the system.

Showing of the power source for the electro-mechanical valve operating devices has been omitted for the sake of simplicity. The apparatus just described operates to carry out the method of the invention in the following manner.

Assuming that the time for the blowing of the representative digester 1 has substantially been reached, the responsiveness of the thermal element 50 to the air within the vomit stack, and hence within the system will be such that the coolness of the air will result in the valve 22 being in fully opened position. The valve 33 in the steam line 32 will also be fully open, though there will not yet be any steam in this line. The blow valve 4 will, of course, be closed. To prepare for the blowing, steam will be introduced into the line 32 from a suitable source and will flow down through the portion 35 and be emitted through the jet 36. At the same time a greater portion of the steam will pass along the branch pipe 34, down through the feeder line 37 and will be emitted directly into the blowpit out of the jets 43 through 47 inclusive. This results in a filling of the system with steam and the driving out of air from the line 2, the blowpit 3, the vomit stack 20. As soon as this has been achieved, and before any air can get back into these spaces, the blowing of the digester into the blowpit must be immediately effected. This action is brought about by the thermal responsive element 50.

The transmission of an impulse by the member 50 to change the positions of the valves 22, 33 and 4, depends of course on temperature within the vomit stack 20. The temperature in the vomit stack increases as the percentage of steam to air in that stack increases. Accordingly, the temperature alone is a good indicator of the displacement of the air by steam.

The extent to which the displacement needs to be carried to achieve worthwhile efficiency depends on the efficiency of the condenser and absorption system employed in the overall system. The more efficient the condenser and absorption system, the lower the temperature at which the member 50 can be set to cause actuation of the valves by the member 51 and thus the shorter the steaming time for displacing the air in the system, and accordingly the less steam that needs to be used. Conversely if the efficiency of the condenser and absorption system is low, the greater the necessity for displacing air and non condensable gases by steam and the greater amount of steam that must be used.

In view of the variety of condenser and absorption systems in use and available, about the best that can be said is that, depending on the particular system, to get a satisfactory displacement of air and other non condensable gases by steam, the temperature which would cause the member 50 to act should be in the range between 160° and 180° F.

Once the proportion of steam to air in the vomit stack 20 is such that the temperature is raised to the response level of the member 50, that member will cause the control device 51 to close the circuits 52, 53 and 54 to the various valve operating devices 55, 56 and 57. This will then result forthwith in the complete closing of the vomit stack valve 22, which up to this point has been fully open, complete closing of the steam line valve 33, and the full opening of the blow valve 4. Thus the blowing of the condenser into the blowpit 3 will take place while the system is still filled with steam and before air can get back into it. The blowing will, accordingly, proceed and though the valve 22 is closed, the building up of back pressure will not be a factor so long as the capacity of the condenser and the size of the inlet line 24 are great enough that steam from the blow, along with steam already in the system, as well as the $SO_2$ and other gases, can be taken care of in the condenser 23. The condensing of the steam in the condenser will quickly reduce its space requirements and the $SO_2$ and other gases will be taken off through the line 27. The steam resulting from the blowing of the digester will not be lost up the vomit stack as in prior art practices, but will give off its heat content in the condenser. The heat recovery here will be generally comparable to what is lost in accordance with the invention by the live steam liberated to atmosphere out of the vomit stack in the course of clearing the stack and blowpit of air.

In the event that vacuum should tend to develop in the system during the latter part of the blow, the element 62 will respond to it, will act through the motor 64 and link 65 to control the position of the valve 61. Also the water seal 66 will serve as a further safeguard by acting as a vacuum breaker.

Though a completely automatic valve controlling operation is here shown responsive to the action of the thermal element 50, it is of course to be understood that so long as proper coordination is established and maintained the closing or opening of any one or more of the valves as the case may be, may be carried out manually. Furthermore, though a surface condenser has been illustrated at 23, various other types of apparatus for serving the same purpose or achieving more complete results may be employed in place of the surface condenser. For instance, a jet condenser may replace the surface condenser, or an assembly combining a jet condenser with an accumulator tank and a surface condenser may be employed, or as a further alternative, a direct absorption system or other $SO_2$ gas collecting system may be employed.

With regard to the particular showing of the manner of introducing steam into the blowpit, vomit pipe and blow pipe, it is of course to be understood that this is merely an illustrative showing of a type of apparatus which can be employed for carrying out the method of the invention. The steam introducing means can differ in type from those shown and can, of course, be located differently with respect to the blowpit and pipes. Accordingly, this disclosure is by no means to be construed in a limiting sense, but rather as illustrative of the presently preferred form of apparatus and of an operable effective means for carrying out the method of the invention.

Speaking more generally, since certain changes in carrying out the above method and in the construction set forth which embody the invention may be made without departing from its scope, it is intended that all matter contained in the above description, or shown in the accompanying drawing shall be interpreted as illustrative and not in a limiting sense.

Having disclosed my invention, what I claim as new and desire to secure by Letters Patent is:

1. A system for preventing the dilution with gas of $SO_2$ gas given off in the blowing of a sulphite digester through a blow pipe equipped with a blow valve into a blowpit equipped with a vomit stack for the escape of gases, said vomit stack having a shut-off valve therein, which comprises, means for introducing live steam into said blowpit and said vomit stack to drive the air therefrom, means responsive to raised temperature in the vomit stack resulting from steam passing up the same for closing said vomit stack shut-off valve to stop the flow therethrough, means for stopping said introduction of live steam, means for opening said blow valve immediately after the closing off of said vomit stack valve and the shutting off of said steam, a condenser for receiving steam and gas from the vomit stack, conduit means positioned in advance of said vomit stack shut-off valve and connecting the interior of said vomit stack with the interior of said condenser and valve means in said conduit for controlling the flow of said steam and gas through said conduit.

2. A system as in claim 1 and including control means operated by said temperature responsive means for sequentially closing said vomit stack valve, shutting off said steam supply and opening said blow valve.

3. A system as in claim 1 and including a negative pressure responsive means in communication with the interior of said vomit stack, and means controlled by said pressure responsive means to vary the flow through said conduit.

4. The method of avoiding the dilution of $SO_2$ gas with air in a blowpit and vomit stack when blowing a sulphite digester on the completion of a cook therein which comprises, filling said blowpit and vomit stack with live steam just prior to the blowing of the digester in order to drive substantially all of the air out of the blowpit and vomit stack, stopping the flow out through the vomit stack and stopping the supply of live steam when the temperature in the vomit stack indicates that substantially all the air has been removed, immediately thereafter blowing the digester and separating the steam and mixture of non-condensable gases including $SO_2$ resulting from the blowing of the digester by condensing the steam in a condenser and thereafter absorbing the $SO_2$ from the non-condensable gases to recover the $SO_2$.

5. Method as in claim 4 and including, automatically and sequentially stopping the flow through the vomit stack, shutting off the steam supply and blowing the digester.

6. The method as in claim 4 and including varying the quantity of steam and mixture of non-condensable gases entering the condenser in response to negative pressure within the vomit stack.

References Cited in the file of this patent

UNITED STATES PATENTS

| | | |
|---|---|---|
| 1,327,666 | Fagan et al. | Jan. 13, 1920 |
| 1,908,615 | Oman | May 9, 1933 |
| 1,947,888 | Thorne | Feb. 20, 1934 |
| 2,996,423 | Nyquist | Aug. 15, 1961 |